A. H. BARTLETT.

Improvement in Templets for Cutting Miters.

No. 129,516.                  Patented July 16, 1872.

Witnesses,            Albert H. Bartlett,
                       Inventor
                       By Atty.

UNITED STATES PATENT OFFICE.

ALBERT H. BARTLETT, OF NEW HAVEN, CONNECTICUT.

IMPROVEMENT IN TEMPLETS FOR CUTTING MITERS.

Specification forming part of Letters Patent No. 129,516, dated July 16, 1872.

*To all whom it may concern:*

Be it known that I, ALBERT H. BARTLETT, of New Haven, in the county of New Haven and State of Connecticut, have invented a new Improvement in Joiners' Templet for Cutting Miters; and I do hereby declare the following, when taken in connection with the accompanying drawing and the letters of reference marked thereon, to be a full, clear, and exact description of the same, and which said drawing constitutes part of this specification and represents, in—

Figure 1:
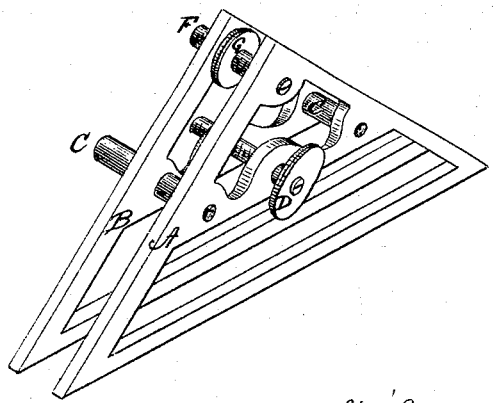
Figure 2:
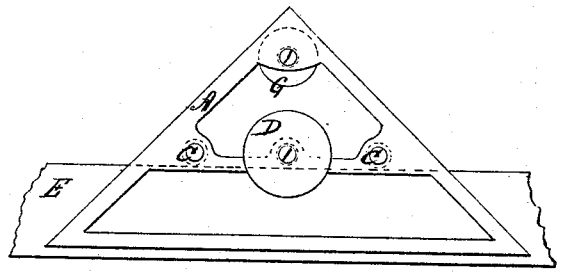

Figure 1, a perspective view; Fig. 2, a top view, illustrating the application of the device; and in Fig. 3 a transverse central section of the same.

This invention relates to a device used as a substitute for the common miter-box, the object being the construction of a device which may be secured upon the material upon which the miter is required to be cut, the edge forming a guide for the tool in cutting the angle; and the invention consists in a pair of plates, by preference of triangular form, one of the angles being a right angle, with suitable guides and adjusting device, by means of which the two said plates may be secured upon the material upon which the miter is to be formed, in a position that one of the sides will indicate where the angle is to be formed, so that at that point, employing the plate as the guide, the angle may be dressed.

A is one plate; B the other; in one of which studs C are secured, and through the other in corresponding position, perforations are made, so that the said perforated plate will slide freely on said studs, the studs serving as guides to retain the two plates in proper relative position to each other. The lower edges of these plates may be made of any desirable shape, the other sides corresponding to the angle required to be formed, usually as for miters forty-five degrees from the line of the guide C, these guides forming the base by which the instrument is adjusted. Centrally, or in other convenient position, an adjusting-screw, D, is arranged by which the plates may be adjusted to or from each other.

Figure 3:
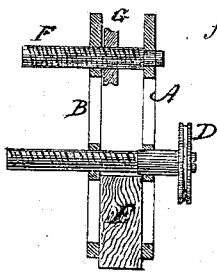

The device thus constructed is placed upon the material E, upon which the angle is to be formed, as seen in Figs. 2 and 3, the studs C resting upon one edge of the material. Thus placed upon the material the screw D is turned to clamp the material between the two plates, as seen in Fig. 3, one of the sides being brought to the exact point where the angle is to be finished. Thus secured, the angle is cut or dressed, the edge of the plates serving as a guide for such dressing and insures the perfect formation of the angle. In order to prevent the canting or tipping of the plates when clamped upon the material I arrange a threaded stud, F, on one plate passing through the other, with a nut, G, thereon between the plates, the said nut being turned down against one plate to form a bearing between the plates, as seen in Fig. 3, distant from each other corresponding to the thickness of the material to be cut.

While the best construction is for two angles, one will answer the purpose, it only being necessary to reverse the instrument to cut opposite ends; hence, if desired, one side may be for cutting a miter and the other for cutting a different angle.

I claim as my invention—

The two plates A B, adjustable relative to each other, and so as to be clamped upon the material to be cut, substantially in the manner described.

A. H. BARTLETT.

Witnesses:
A. J. TIBBITS,
J. H. SHUMWAY.